United States Patent [19]

Thurn

[11] 3,969,301

[45] July 13, 1976

[54] POLYTETRAMETHYLENEETHER POLYURETHANE ADHESIVE COMPOSITION

[75] Inventor: Robert Dean Thurn, Wilmington, Del.

[73] Assignee: E. I. Du Pont de Nemours and Company, Wilmington, Del.

[22] Filed: June 30, 1972

[21] Appl. No.: 268,046

Related U.S. Application Data

[63] Continuation-in-part of Ser. No. 182,913, Sept. 20, 1971, abandoned.

[52] U.S. Cl. .................. 260/30.4 N; 260/30.8 DS; 260/32.6 NR; 260/32.8 N; 260/33.2 R; 260/77.5 AM
[51] Int. Cl.² .......................................... C08G 18/66
[58] Field of Search ............. 260/77.5 AM, 75 NP, 260/33.4 UB, 32.8 R, 32.6 NR, 30.4 N

[56] References Cited
UNITED STATES PATENTS

| | | | |
|---|---|---|---|
| 3,184,426 | 5/1965 | Thoma | 260/32.6 N |
| 3,401,133 | 9/1968 | Grace | 260/77.5 AM |
| 3,446,771 | 5/1969 | Matsubayashi | 260/32.6 N |
| 3,470,121 | 9/1969 | Cobbledick | 260/37 N |
| 3,541,053 | 11/1970 | Harrell | 260/33.4 UB |

*Primary Examiner*—Paul R. Michl

[57] ABSTRACT

A polyurethane composition which is the reaction product of (a) 4,4'-methylenebis(phenyl isocyanate), (b) tolylene diisocyanate, (c) 1,4-butanediol and (d) polytetramethyleneether glycol having a number average molecular weight of about 600–2100; the mole ratio of (a) to (b) being about 1.2/1 to 2.5/1, the mole ratio of (c) to (d) being such that the average molecular weight of a mixture of (c) and (d) is about 450–850, and the mole ratio of (a) plus (b) to (c) plus (d) being about 1/1.015 to about 1/1.050. Such polyurethanes form exceptionally good adhesives.

12 Claims, No Drawings

POLYTETRAMETHYLENEETHER POLYURETHANE ADHESIVE COMPOSITION

CROSS-REFERENCE TO RELATED APPLICATION

This application is a continuation-in-part of application Ser. No. 182,193 filed Sept. 20, 1971, now abandoned.

BACKGROUND OF THE INVENTION

Numerous polyurethane adhesive systems are known for adhering polyvinyl chloride but most are deficient in some respect such as poor hot peel properties, poor bond strength, and poor solubility in conventional adhesive solvents.

Several polyester-based polyurethane adhesives are commercially available for bonding plasticized polyvinyl chloride but these are generally deficient in their hot peel properties.

Polyether-based polyurethanes have also been suggested for adhesive applications. U.S. Pat. No. 2,929,800 to Hill broadly discloses as useful in adhesive compositions a polyurethane prepared from a polyalkyleneether glycol, a molar excess of an organic diisocyanate and a chain-extending agent. However, some of the polyurethane compositions taught in the patent are deficient as adhesives in certain respects, as, for example, hot peel, bond strength, and solubility in conventional solvents such as methyl ethyl ketone.

U.S. Pat. No. 2,899,411 to Schollenberger discloses polyurethane compositions prepared from poly(polymethylene oxide), a saturated aliphatic glycol and a diphenyl diisocyanate. Such polyurethanes, not being soluble in conventional adhesive solvents such as methyl ethyl ketone, usually result in poor adhesive systems. In general, adhesives prepared from compositions disclosed in the patent also have high heat activation temperatures, rendering them undesirable for use with plasticized polyvinyl chloride.

There is, therefore, a need for a polyurethane composition which is useful in adhesive applications, which is soluble in conventional solvents such as methyl ethyl ketone, and which results in adhesive systems exhibiting good hot peel properties, good bond strength, and desirable heat-activation temperatures for use with plasticized polyvinyl chloride.

SUMMARY OF THE INVENTION

In accordance with the present invention there is provided a polyurethane composition which is useful as an adhesive and which is the reaction product of (a) 4,4'-methylenebis(phenyl isocyanate), (b) tolylene diisocyanate, (c) 1,4-butanediol, and (d) polytetramethyleneether glycol having a number average molecular weight of about 600–2100; wherein the mole ratio of (a) to (b) is about 1.2/1 to 2.5/1, the mole ratio of (c) to (d) is such that the average molecular weight of a mixture of (c) and (d) is about 450–850, and the mole ratio of (a) plus (b) to (c) plus (d) is about 1/1.015 to 1/1.050.

DETAILED DESCRIPTION OF THE INVENTION

The 4,4'-methylenebis(phenyl isocyanate), hereinafter MDI, used in this invention is well known in the art and can be prepared by procedures such as those described in U.S. Pat. No. 2,822,373 to Beck U.S. Pat. No. 3,163,666 to Kires et al., and U.S. Pat. No. 3,471,543 to Sayigh.

The tolylene diisocyanate (TDI) employed in this invention is 2,4-tolylene diisocyanate or, preferably, mixtures thereof with 2,6-tolylene diisocyanate wherein the mixture contains up to about 35 weight per cent of the 2,6-isomer. Such TDI compositions are prepared by phosgenation of the corresponding tolylene diamines. Typical phosgenation procedures are described in U.S. Pat. No. 2,822,373 to Beck, U.S. Pat. No. 2,680,127 to Slocombe et al., and U.S. Pat. No. 2,908,703 to Latourette et al. The preferred TDI compositions for use with this invention contain about 80 weight per cent 2,4-isomer and about 20 weight per cent 2,6-isomer.

The polytetramethyleneether glycol (hereinafter PTMEG) employed in the present invention is well known to those skilled in the art and is described more particularly in U.S. Pat. No. 2,929,800 to Hill and U.S. Pat. No. 2,492,955 to Ballard. For the purposes of this invention, the number average molecular weight of PTMEG should be between about 600 and 2100; however, molecular weights ranging from about 900 to 1800 are particularly preferred.

The amount of each reactant employed in preparing the polyurethanes of this invention is critical in order to obtain a composition exhibiting superior adhesive properties. In preparing the polyurethanes of this invention the mole ratio of reactants is as follows:

MDI/TDI = 1.2/1 to 2.5/1

1,4-Butanediol/PTMEG = is such that the mixture of 1,4-butanediol and PTMEG has an average molecular weight of about 450–850

MDI + TDI/1,4-butanediol + PTMEG = 1/1.015 to 1/1.050.

The MDI/TDI ratio and to a lesser extent the 1,4-butanediol/PTMEG ratio are critical in order to obtain an adhesive system exhibiting good hot peel, good bond strength, desirable heat activation temperature and to obtain a composition which is soluble in conventional solvents such as methyl ethyl ketone.

The ratio MDI + TDI/1,4-butanediol + PTMEG must be maintained within the stated ranges in order to obtain a composition which yields solutions having a suitable viscosity for use as an adhesive. Within the range of ratios included in this invention, heat activation temperature, hot peel strength and adhesive solution viscosity all increase as the ratio is decreased.

Within the composition limits of the present invention there are two preferred ranges of compositions.

The first of these preferred compositions has the following mole ratios:

MDI/TDI = 1.4/1 to 1.6/1

1,4-butanediol/PTMEG is such that the mixture has an average molecular weight of 500–700

MDI + TDI/1,4-butanediol + PTMEG = 1/1.02 to 1/1.04.

These compositions are characterized by heat activation temperatures within the range of about 60°–65°C and are ideally suited for bonding polyvinyl chloride shoe upper materials to SBR shoe soling materials. The addition of minor amounts of chlorinated natural or synthetic rubber to these polyurethanes usually improves the peel strength at ambient and/or elevated temperatures.

The second preferred composition has the following mole ratios:

MDI/TDI = 1.75/1 to 1.95/1

1,4-butanediol/PTMEG is such that the mixture has an average molecular weight of 450–650

MDI + TDI/1,4-butanediol + PTMEG = 1/1.02 to 1/1.04.

The compositions are characterized by heat activation temperatures of 80°–85°C and are particularly useful for bonding vinyl shoe upper materials to vinyl soling materials.

The polyurethanes of this invention can be prepared by one-shot or prepolymer procedures, both of which are well known in the art. In the one-shot procedure the isocyanates, the glycol and the diol are mixed together and reacted simultaneously. In prepolymer procedures an excess of isocyanate is reacted with the glycol (or with part of the mixture of glycol and diol) to prepare an isocyanato-terminated prepolymer which is then reacted with the remaining diol (or mixture of glycol and diol). An alternative prepolymer procedure involves formation of a hydroxyl-terminated prepolymer by reaction of excess glycol plus diol with part of the isocyanates and subsequent reaction of the prepolymer with the remaining isocyanate. Such techniques are well known to those skilled in the art. Typical polymerization procedures are, for example, depicted in U.S. Pat. No. 2,929,800 to Hill. The most convenient and preferred polymerization method is the prepolymer method.

Catalysts can be used to advantage in one-shot or prepolymer procedures to speed the reaction. This is desirable in that prolonged heating to complete the reaction and post-reaction with atmospheric moisture are avoided. Preferred catalysts are organo-tin compounds such as dibutyl tin dilaurate. These catalysts are used in amounts of 0.0001–0.1% based on the weight of reaction mixture. Other suitable catalysts for the reaction are lead naphthenate and ferric acetylacetonate.

Adhesive solutions of the polyurethane of the present invention are prepared by dissolving the polyurethane in typical adhesive solvents including ethers having 4-6 carbon atoms such as tetrahydrofuran, dioxane, 1,2-dimethoxyethane and diisopropyl ether; ketones having 3-7 carbon atoms such as acetone, methyl ethyl ketone, methyl isobutyl ketone and diisopropyl ketone; N,N-dialkyl lower amides containing 3–6 carbon atoms such as dimethyl formamide, dimethyl acetamide and N,N-diethyl formamide and sulfones and sulfoxides having 2–4 carbon atoms such as dimethyl sulfoxide and tetramethylene sulfone. $C_1$-$C_4$ alkyl substituted benzenes such as toluene and xylene can be used in admixture with the above solvents. The preferred solvent is methyl ethyl ketone because of its low cost and low toxicity. A solvent mixture of about equal parts of methyl ethyl ketone and toluene containing up to about 5% by weight tetrahydrofuran is also very economical when toluene can be tolerated.

For initial "quick bite" (wetting ability) a solvent system of about equal volumes of tetrahydrofuran and methyl ethyl ketone or all tetrahydrofuran is recommended. Other systems which give improved "quick bite" over straight methyl ethyl ketone are 90:10 (parts by weight) :: methyl ethyl ketone: dimethyl ether of ethylene glycol, or 79:16:4 (parts by weight) mixed methyl ethyl ketone/ethanol/tetrahydrofuran and combinations of these.

It is preferred that the solvent adhesive system contain about 10–25% by weight of the polyurethane.

Other materials can be added to the polyurethanes of this invention or their solutions if desired. For instance, plasticizers, soluble phenolic resins, chlorinated rubber and cellulose nitrate can be added in minor amounts to modify the adhesives for certain applications. Conventional additives such as antioxidants and pigments can be added when it is desirable.

When the reaction is carried out in a solvent, use of a catalyst of the type hereinbefore described is particularly desirable since the dilution lowers the reaction rate and the polarity of the solvent tends to solvate the glycol and diol and render them less reactive. Suitable solvents include those inert to isocyanates which are also capable of dissolving from about 20 to 35 weight per cent of polyurethane elastomer solids; adhesive solvents of the type hereinbefore described are typical. When the polyurethane is made by the solvent process, it can be used directly as a solution adhesive.

While it is usually more economical to prepare the polyurethanes of this invention in the absence of solvents and subsequently prepare solutions as needed, it is also possible to prepare the polyurethanes in a solvent to yield adhesive solutions directly.

Bonding is actually effected with the adhesive solutions by coating at least one surface and preferably both of the surfaces to be joined with adhesive solution. The solvent is allowed to evaporate partially until the adhesive surfaces become tacky at which point, joining can be effected. In an alternative and preferred procedure the solvent is allowed to evaporate substantially completely and the bond is formed by heating the dry adhesive layers to about 60°–85°C. and pressing them together while still hot. Use of the adhesives of this invention is not limited to solutions. For example, the polyurethanes can be used as hot melt adhesives if they are first plasticized by the addition of a plasticizer such as dioctyl phthalate or tricresyl phosphate.

The polyurethanes of this invention can be used to form adhesive bonds between a wide variety of plastics, elastomers, fabrics, metals, wood, leather, ceramics and the like. The composition of this invention is a particularly good adhesive for plasticized polyvinyl chloride because of its heat activation temperature.

While batch and continuous preparative techniques employing either one-shot or prepolymer methods can be used, the most convenient and preferred methods are the prepolymer techniques depicted in the examples.

The prepolymer techniques are preferred because they reduce the heat evolution at any one time in that the reaction is carried out in two or more steps. A higher exotherm makes the reaction difficult to control and it is well known that at temperatures above 120°C. allophanate formation can become considerable.

EXAMPLE 1

A polyurethane composition is prepared by reacting a hydroxyl-terminated prepolymer with 4,4'-methylenebis(phenyl isocyanate) (MDI) in a continuous mixing machine, the two streams being fed to the mixer head at 60°C. The prepolymer is prepared by reacting 0.7 mole of the mixed isomers of 2,4- and 2,6- (80:20 respectively) toluene diisocyanate (TDI) and 0.3 mole of 4,4'-methylenebis(phenyl isocyanate) with a mixture of 1.07 moles of polytetramethyleneether glycol (PTMEG) (molecular weight 970) and 1.0 mole of 1,4-butanediol (BDO) at a temperature of 80°C. for thirty minutes under nitrogen in the presence of 0.008% dibutyl tin dilaurate based on the weight of reaction mass (the molecular weight referred to is "effective molecular weight". Approximately one equivalent of the glycol is reacted with two equivalents of 2,4-tolylene diisocyanate. The resulting resin is titrated to determine per cent NCO and from this the effective molecular weight of the glycol can be calculated). In the mixing machine, the prepolymer is reacted with exactly one fifth its weight of 4,4′-methylenebis(phenyl isocyanate) such that the mole ratio of reactants in the final product is 1.3/0.7/1.07/1.0 in MDI/TDI/PTMEG/BDO, respectively. The mixtuure from the mixing machine is run into poly(tetrafluoroethylene)-lined pans where urethane formation is completed.

The resulting material is dissolved in a 50:50 mixture of tetrahydrofuran and methyl ethyl ketone at a 10% solids level. This solution is used to apply an adhesive layer about 3–4 mils thick on a test piece of plasticized polyvinyl chloride Pattina, V-82, a fabric backed vinyl shoe upper material sold by Stauffer Chemicals and a layer 7–9 mils thick on a strip of canvas (unsized No. 10 sail duck). The solvents are allowed to evaporate for 12 hours at about 25°C. until a dry non-tacky surface is obtained. The test pieces are heat activated by placing them in an oven at 125°C. for 8 minutes which raises their temperature to about 65°C., after which they are removed and immediately pressed together at about 100 psi. and allowed to cool under pressure. After three days, 180° peel strength of the samples is determined on a tensile testing machine using a rate of 2 inch/min. At about 25°C. a value of 45 pli. is obtained with failure in the canvas and at 60°C. a value of 20 pli. is obtained with cohesive failure.

COMPARATIVE TEST 1

Following substantially the procedure of Example 1 a polyurethane is prepared which contains one mole of TDI per mole of MDI. In this instance, the prepolymer is prepared from TDI alone. Test pieces are prepared by the procedure of Example 1. At 25°C., the 180° peel strength is only 25 pli. At 60°C. the peel strength is 1.0 pli. Failure at both temperatures is cohesive, demonstrating the poor cohesive strength of this product.

COMPARATIVE TEST 2

Following substantially the procedure of Example 1, a product is made with an MDI/TDI ratio of 3.0/1.0. The required prepolymer is prepared from equimolar amounts of TDI and MDI. Test samples have poor 25°C. and 60°C. peel (8 and 6 pli., respectively). The pulled pieces still have smooth polyurethane surfaces indicating they did not become soft enough at the 65°C. activation temperature to cohere to each other.

Solubility of this polyurethane in methyl ethyl ketone (a preferred solvent) is marginal. A product with 4,4′-methylenebis(phenyl isocyanate) as the only isocyanate does not dissolve appreciably in methyl ethyl ketone, but swells to form a white slushy mass.

EXAMPLE 2

To a mixture of 279.5 g (0.285 moles) of PTMEG (molecular weight about 980) and 25.7 g (0.285 moles) of 1,4-butanediol at 25°C. in a vigorously agitated reactor is added 139.2 g (0.80 moles) of TDI (80% 2,4-isomer, 20% 2,6-isomer). The addition of TDI is completed in less than 1 minute after which the reaction mass is agitated for 30 minutes at 60°–65°C. To this intermediate product is then added 300 g (1.2 moles) of molten (45°–50°C.) MDI. The MDI addition is completed in less than 1 minute and the reaction mixture is agitated for 75 minutes at 70°C. To this reaction mixture is added a mixture of 820 g (0.837 moles) of PTMEG-980 and 57.0 g (0.633 moles) of 1,4-butanediol. The addition of the mixed glycols is made in less than 30 seconds. The mixture, after the glycol addition, is stirred for about 30 seconds and 0.32 g of dibutyltin dilaurate is added. After the addition of the tin catalyst the mixture is agitated for about 15 seconds and immediately poured into pans. The reaction is completed by placing the pans in an oven at 80°C. for 1 hour.

For the polymer produced the mole ratio of MDI to TDI is 1.5/1; the mole ratio of PTMEG-980 to 1,4-butanediol is such that the average molecular weight of a mixture of all of the PTMEG-980 and 1,4-butanediol contained in the polymer is 580 and the mole ratio of MDI plus TDI to PTMEG-980 plus 1,4-butanediol; i.e., the NCO/OH ratio, is 1.00/1.02.

The resulting polymer is dissolved in methyl ethyl ketone at a 20% by weight solids level. The adhesive solution is used for bonding plasticized polyvinyl chloride (Pattina, V-82, a fabric-bcked vinyl shoe upper material sold by Stauffer Chemicals) and a high styrene-butadiene copolymer composition shoe-soling material (Standard "Neolite" Cement Liner). Prior to applying the adhesive solution to these materials, the shoe-upper is wiped once with methyl ethyl ketone and the shoe-soling is buffed with 80-mesh alumina paper. One coat of adhesive solution is then brushed on the shoe upper and soling materials. The solvent is allowed to evaporate for 12 hours at 25°C. which yields dry non-tacky surfaces. The coated test pieces are heat-activated by radiant heat. The surface temperature is increased to 65°–70°C. in about 15 seconds by the source of radiant heat. The test pieces are removed from the heater and immediately placed in contact with one another and pressed at 30–40 psi for 45 seconds. After standing for 2 days at 25°C., 180°C. peel strength of the samples is determined on a tensile testing machine using a rate of 2 inch/minute. At 25°C. a value of 17 psi is obtained. At 60°C., the peel strength is 12 psi.

When 16.7 parts of the polyurethane of this example and 3.3 parts of chlorinated natural rubber (chlorine content 64–65%; viscosity of a 20% by weight solution in toluene at 25°C., 17-25 eps) are dissolved in 80 parts of methyl ethyl ketone and the resulting adhesive solution is used to form bonds as described previously in this example, peel strengths of 23 pli and 16 pli are obtained at 25°C. and 60°C. respectively.

EXAMPLE 3

To a mixture of 279.5 g (0.285 moles) of PTMEG (molecular weight about 980) and 25.7 g (0.285 moles) of 1,4-butanediol at 25°C. in a vigorously agitated reactor is added 121.8 g (0.70 moles) of TDI (80% 2,4-isomer, 20% 2,6-isomer). The addition of TDI is completed in less than 1 minute after which the reaction mass is agitated for 30 minutes at 60°–65°C. To this intermediate product is then added 325 g (1.3 moles) of molten (45°–50°C.) MDI. The MDI addition is completed in less than 1 minute and the reaction mixture is agitated for 75 minutes at 70°C. To this reaction mixture is added a mixture of 720 g (0.735 moles) of PTMEG-980 and 66.2 g (0.735 moles) of 1,4-butanediol. The addition of the mixed glycols is made in less than 30 seconds. The mixture, after the glycol addition, is stirred for about 30 seconds and 0.32 g of dibutyltin dilaurate is added. After the addition of the tin catalyst the mixture is agitated for about 15 seconds and immediately poured into pans. The reaction is completed by placing the pans in an oven at 80°C. for 1 hour.

For the polymer produced the mole ratio of MDI to TDI is 1.86/1; the mole ratio of PTMEG-980 to 1,4-butanediol is such that the average molecular weight of a mixture of all of the PTMEG-980 and 1,4-butanediol contained in the polymer is 535 and the mole ratio of MDI plus TDI to PTMEG-980 plus 1,4-butanediol; i.e., the NCO/OH ratio, is 1.00/1.02.

The resulting polymer is dissolved in tetrahydrofuran at a 20% by weight solids level. The adhesive solution is used for bonding plasticized polyvinyl chloride (Pattina, V-82, a fabric-backed vinyl shoe upper material sold by Stauffer Chemicals) and standard vinyl soling material (shoe soling material sold by O'Sullivan Rubber). Prior to applying the adhesive solution to these materials, both are wiped once with methyl ethyl ketone. One coat of adhesive solution is then brushed on the shoe upper and soling materials. The solvent is allowed to evaporate for 12 hours at 25°C. which yields dry non-tacky surfaces. The coated test pieces are heat-activated by radiant heat. The surface temperature is increased to 80°–85°C. in about 28 seconds by the source of radiant heat. The test pieces are removed from the heater and immediately placed in contact with one another and pressed at 30–40 psi. for 45 seconds. After standing for 2 days at 25°C., 180° peel strength of the samples is determined on a tensile testing machine using a rate of 2inch/minute. At 25°C. a value of 65 pli is obtained. At 60°C., the peel strength is 32 pli.

I claim:

1. A polyurethane composition which consists essentially of reaction product of (a) 4,4'-methylenebis(phenyl isocyanate), (b) tolylene diisocyanate, (c) 1,4-butanediol, and (d) polytetramethyleneether glycol having a number average molecular weight of about 900–2100; the mole ratio of (a) to (b) being about 1.2/1 to 2.5/1, the mole ratio of (c) to (d) being such that the average molecular weight of a mixture of (c) and (d) is about 450–850, and the mole ratio of (a) plus (b) to (c) plus (d) being about 1/1.015 to about 1/1.050.

2. A composition of claim 1 wherein the tolylene diisocyanate is a mixture of 2,4-tolylene diisocyanate and 2,6-tolylene diisocyanate wherein the mixture contains up to about 35 weight per cent of the 2,6-isomer.

3. A composition of claim 2 wherein the mixture contains about 80% of the 2,4-isomer and about 20% of the 2,6-isomer.

4. A composition of claim 1 wherein the polytetramethyleneether glycol has an average molecular weight of about 900 to 1800.

5. A composition of claim 1 wherein the mole ratio of (a)/(b) is about 1.4/1 to 1.6/1, the mole ratio of (c)/(d) is such that the average molecular weight of a mixture of (c) and (d) is about 500–700, and the mole ratio (a) plus (b)/(c) plus (d) is about 1/1.02–1/1.04.

6. A composition of claim 1 wherein the mole ratio of (a)/(b) is about 1.75/1 to 1.95/1, the mole ratio (c)/(d) is such that the average molecular weight of a mixture of (c) plus (d) is about 450–650, and the mole ratio (a) plus (b) to (c) plus (d) is about 1/1.02–1/1.04.

7. A polyurethane composition of claim 1 in a solvent which is an ether of about 4-6 carbon atoms, a ketone of about 3–7 carbon atoms, an N,N-dialkyl lower amide of about 2–4 carbon atoms, a sulfoxide of about 2-4 carbon atoms or a mixture thereof.

8. The product of claim 7 containing about 10 to about 25 weight percent of the polyurethane.

9. The product of claim 7 wherein the solvent is admixed with a $C_1$-$C_4$ alkyl substituted benzene.

10. The product of claim 7 wherein the solvent is methyl ethyl ketone, tetrahydrofuran or mixture thereof.

11. The product of claim 10 wherein solvent is methyl ethyl ketone admixed with about 10% by weight dimethyl ether of ethylene glycol.

12. The product of claim 10 wherein the solvent is methyl ethyl ketone admixed with about 16% by weight ethanol and about 4% by weight tetrahydrofuran.

* * * * *